United States Patent [19]

Winslow

[11] 4,147,379
[45] Apr. 3, 1979

[54] VEHICLE FRAME

[75] Inventor: Gerald R. Winslow, Troy, Mich.

[73] Assignee: United States Steel Corporation, Pittsburgh, Pa.

[21] Appl. No.: 810,056

[22] Filed: Jun. 27, 1977

[51] Int. Cl.² .............................................. B60G 21/02
[52] U.S. Cl. ..................................... 280/781; 52/729; 280/799
[58] Field of Search ................... 280/106 R, 781, 799; 52/729

[56] References Cited

U.S. PATENT DOCUMENTS

| 1,649,577 | 11/1927 | Coryell | 52/691 |
| 3,263,387 | 8/1966 | Simpson | 52/729 |
| 3,300,839 | 1/1967 | Lichti | 29/155 |
| 3,940,162 | 2/1976 | Winslow | 280/106 R |

Primary Examiner—Joseph F. Peters, Jr.
Assistant Examiner—John A. Carroll
Attorney, Agent, or Firm—McGlynn and Milton

[57] ABSTRACT

A vehicle frame assembly including two generally parallel, elongated side rail members and a plurality of cross members connecting the side rail members; each of the side rail members including an upper plate member, a lower plate member and a web member between the upper and lower plate members, the web member including a plurality of primary web sections having a truncated-triangular shape located along the length of the side rail member, adjacent primary web sections being inverted and spaced laterally with respect to one another and intermediate web sections connecting adjacent primary web sections.

13 Claims, 6 Drawing Figures

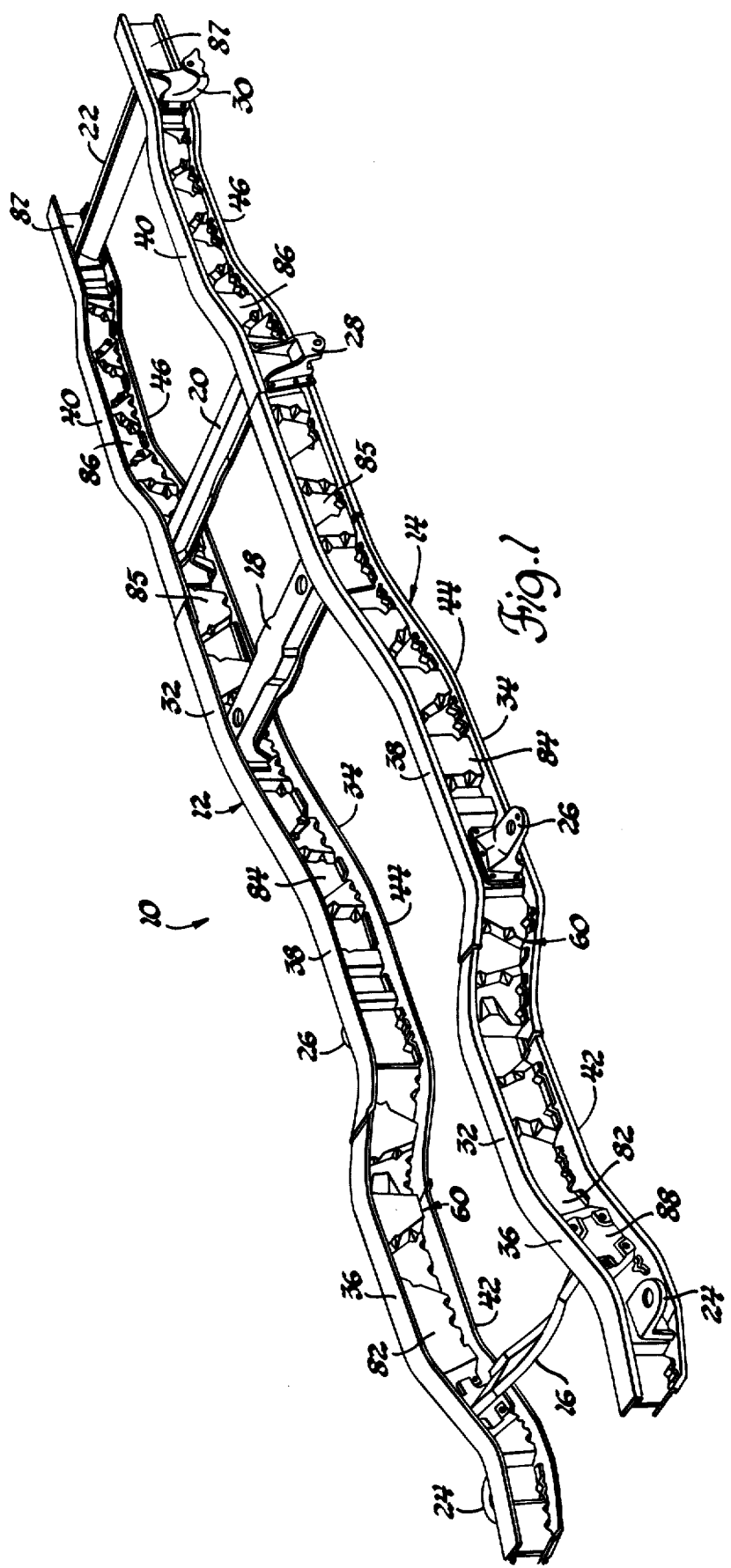

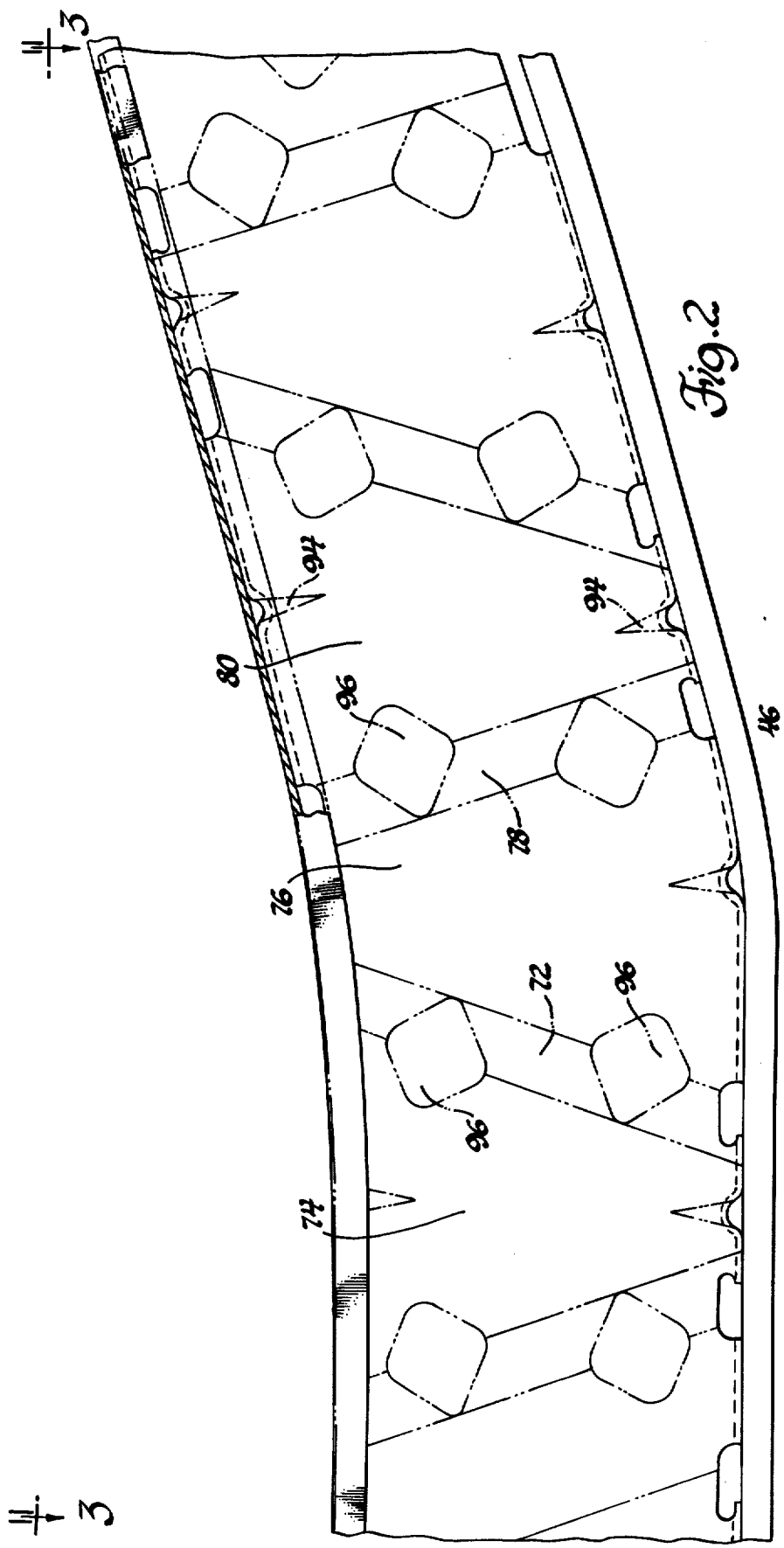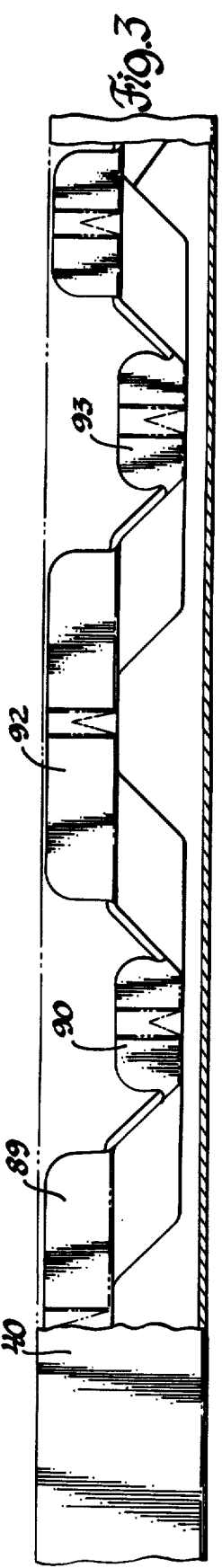

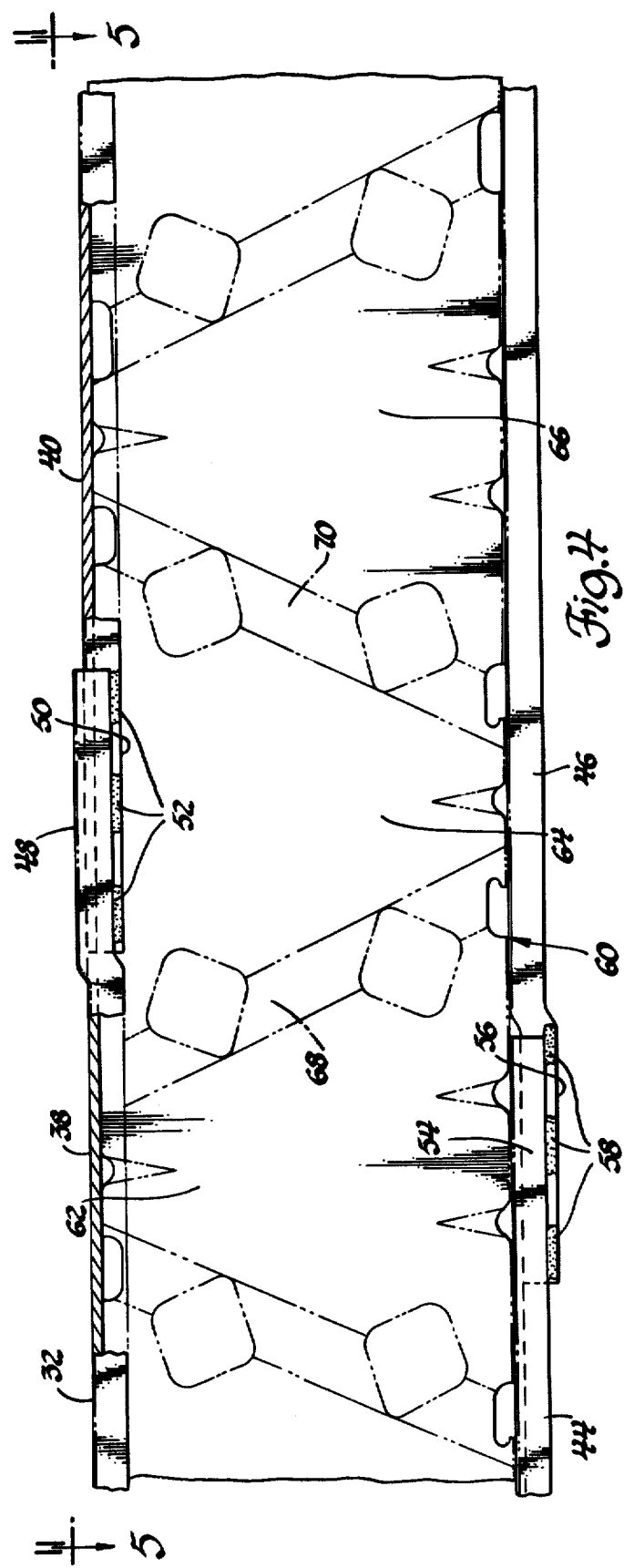

VEHICLE FRAME

FIELD OF THE INVENTION

This invention relates to a vehicle frame which is lighter than current vehicle frames and more economical to produce. Moreover, the design of the vehicle frame permits the variation of physical properties along the length thereof to permit tailoring of the vehicle frame in accordance with varying load requirements at specific locations along the length of the frame.

BACKGROUND OF THE INVENTION

Vehicle frames for automobiles and light trucks currently include a pair of side rail members of C-channel or I-beam configuration. The side rail members are joined together by a plurality of cross members for supporting various components of the vehicle drive train and body. These side rails normally consist of one-piece stampings.

Under current design the vehicle frame is viewed largely as a platform, the suspension and drive train being hung underneath it and the engine and body being stacked on top of it. Heretofore, no real effort has been made to incorporate the vehicle frame as part of the suspension system.

BRIEF SUMMARY OF THE INVENTION

The vehicle frame of the instant invention includes two side rail members which are designed to reduce the weight of the vehicle frame assembly while achieving strength characteristics at least comparable to those of conventional side rail members. The design of the side rail members facilitates economy of fabrication and also permits tailoring of the vehicle frame to the varying load requirements, e.g. vertical bending, lateral bending and torsional rigidity, at specific locations along the length of the vehicle frame. In short, the strength of the side rail members can be increased at high load regions, such as spring hangers, shock absorber towers and cross members, and reduced at intermediate low load regions. Consequently, a significant weight saving can be achieved.

More specifically, the vehicle frame assembly includes two generally parallel, elongated side rail members and a plurality of cross members connecting the side rail members together. Each of the side rail members includes an upper plate member, a lower plate member and a web member between the upper and lower plate members. The web member consists of a plurality of primary web sections having a truncated-triangular shape located along the length of the side rail member. Adjacent primary web sections are inverted and spaced laterally with respect to one another and are connected together by intermediate web sections. This configuration of the web member permits a significant reduction in weight without loss of strength in lateral bending, vertical bending, or torsion. Moreover, since a multi-piece design is employed, individual components may be stamped from suitable sheet material and thereafter assembled into a complete unit. This eliminates the need for large dies and other expensive forming operations.

DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a vehicle frame assembly constructed in accordance with the instant invention;

FIG. 2 is an elevational view of a section of a side rail member of the vehicle frame assembly shown in FIG. 1;

FIG. 3 is a view taken generally along line 3—3 of FIG. 2;

FIG. 4 is an elevational view of another section of the side rail member of the vehicle frame assembly shown in FIG. 1;

FIG. 5 is a view taken generally along line 5—5 of FIG. 4; and

DETAILED DESCRIPTION OF THE INVENTION

Figure 6:
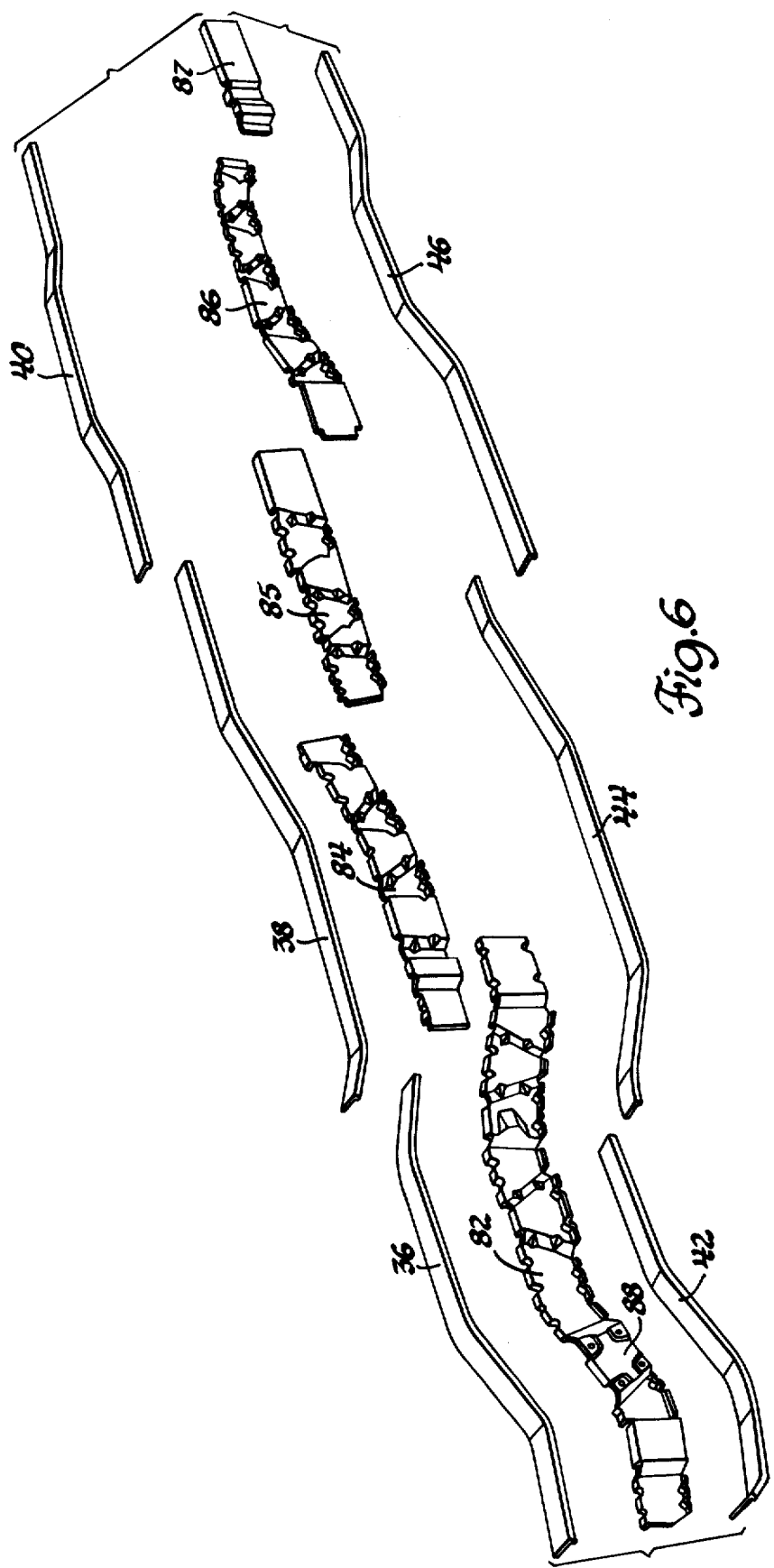
FIG. 6 is a perspective, exploded view showing the components of one of the side rail members of the vehicle frame assembly shown in FIG. 1.

Referring to the drawings, a vehicle frame assembly constructed in accordance with the instant invention is generally shown at 10 in FIG. 1. The vehicle frame assembly includes two generally parallel, elongated side rail members generally indicated at 12 and 14.

The side rail members 12 and 14 are connected by a plurality of cross members 16, 18, 20 and 22. These cross members are of standard design and function. In other words, the side rail members 12 and 14 are designed to receive the standard cross members used in current vehicle frames by automobile and truck manufacturers. More specifically, the vehicle frame assembly shown in FIG. 1 has been designed specifically for use in a light truck assembly. The cross members shown are those which are used in a light truck vehicle frame; that is, the first cross member 16 is the engine cross member, the second cross member 18 is a drive line support, and the third and fourth cross members 20 and 22 are deck supports. Additional standard brackets are also attached to the side rail members and include a front cab mount 24, a rear cab mount 26, a front-rear spring hanger 28 and a rear spring hanger 30. Additional cross members may be bolted to the side rail members 12 and 14 by the manufacturer as required to accomodate for different engine and transmission sizes.

The uniqueness of the vehicle frame assembly 10 resides in the design of the side rail members 12 and 14. The specific configuration of the web of the side rail members increases their strength in lateral and vertical bending as well as torsion. Therefore, the weight of the side rail members can be reduced without sacrificing strength. The configuration of the web can also be varied along the length of the side rail members to tailor the side rail members to the nonuniform loading which is characteristic of a vehicle frame. In other words, the configuration of the web permits a variation in the rate of flex at any point along the vehicle frame to accomodate for the variation in loading along the length if the frame. Additionally, the design of the side rail members permits fabrication by a process which includes stamping and welding and thus reduces manufacturing costs.

Each of the side rail members 12 and 14 includes an upper plate member 32 and a lower plate member 34 which extend the length of the vehicle frame assembly. As shown in FIG. 6, the upper and lower plate members are made from multiple pieces. The upper plate member 32 is made from three pieces identified by numerals 36, 38 and 40 and the lower plate member 34 is made from three pieces identified by numerals 42, 44 and 46. The pieces for the upper and lower plate members 32 and 34 are made, for example, from an SAE 1008 hot rolled steel having a thickness of about 0.120 inches. The upper and lower plate members 32 and 34 are made in pieces to reduce the required bed length of the stamping press. The individual pieces of the upper and lower plate members 32 and 34 are subsequently joined together. As shown in FIG. 4, and referring to the upper plate member 32, the end 48 of piece 38 overlaps the end 50 of the adjacent piece 40. These two pieces are joined by welding as indicated by weldments 52. Similarly, the end 54 of piece 44 of the lower plate member 34 overlaps the end 56 of the adjacent piece 46. The pieces 44 and 46 are joined by weldments 58 along the lower edge of the upper piece 44.

In order to insure maximum strength, the lap joints between adjacent pieces of the upper and lower plate members are not aligned in a vertical plane. In other words, as shown in FIG. 4, the lap joint between adjacent pieces 38 and 40 in the upper plate member 32 does not lie directly above the lap joint between the adjacent pieces 44 and 46 in the lower plate member 34.

Between the upper and lower plate members 32 and 34 is a web generally indicated at 60. While the configuration of the web varies along its length particularly at those locations where cross members are connected, the basic unit shape employed to provide the desired strength characteristics can generally be described as a truncated-triangular shape. More specifically, as shown in FIG. 4, the web member 60 includes a plurality of primary web sections 62, 64, and 66 having a truncated-triangular shape. These primary web sections are located longitudinally along the side rail member. Adjacent primary web sections, e.g., web sections 62 and 64, are inverted and spaced laterally with respect to one another. The adjacent primary web sections 62, 64, and 66 are connected by intermediate web sections 68 and 70. The combination of the primary web sections and the intermediate web sections produces a truss-like structure. It is particularly pointed out that the inclined intermediate web sections 68 and 70 spread applied loads over a larger portion of the rail member than would vertical web sections.

One design variable which permits adjustment of the strength of the rail member is the incline angle of the intermediate web sections. As shown in FIG. 4, the incline angle, that is, the angle between the intermediate web sections and the upper and lower plate members is maintained substantially constant. However, as shown in FIG. 2 the incline angle may be varied. More specifically, the incline angle between the intermediate web section 72 which joins primary web sections 74 and 76 is different than the incline angle of the intermediate web section 78 which joins primary web sections 76 and 80.

Another design variable which is used to adjust the loading characteristics of the side rail members is the lateral spacing between adjacent primary web sections. As noted above, the primary web sections are spaced one from the other along the length of the side rail members. Additionally, as shown in FIGS. 3 and 5, adjacent primary web sections are spaced laterally one from the other. The strength characteristics can be changed by varying the lateral spacing. When the lateral spacing is diminished, the configuration approaches that of an I-beam. Increasing the lateral spacing increases the strength of the side rail members. Additionally, the longitudinal distance between adjacent primary web sections and the width of the intermediate web sections can also be varied. In this manner, the rail members can be designed to respond to the loading to which it is subjected so that the vehicle frame functions as an integral part of the suspension system.

As shown in FIG. 6, the web member 60 is assembled from multiple pieces 82, 84, 85, 86 and 87. Forming the web in pieces not only reduces the size of the stamping equipment required to form the individual pieces, but also permits the use of sections having different thicknesses or entirely different materials. For example, if splash tests indicate that certain regions of the side rail member are subjeced to a more concentrated corrosive environment than other sections, those sections may be made of a material having higher corrosion resistance. If greater strength is required in a certain section, a heavier guage material can be used or a material having greater strength can be used. In this manner significant design freedom can be achieved.

Adjacent web pieces are joined by overlapping the ends of the pieces to form a lap joint. At least some of the lap joints are strategically located to correspond to the location of the more heavily loaded cross members. For example, as shown in FIG. 1, the location of the lap joint between the middle two web pieces 84 and 85 corresponds to the location of the drive line support 18. Generally, the minimum thickness of the web member will be 0.090 inches; however, at the lap joint the thickness is doubled. Hence, the cross member 18 is connected to a web of double thickness, that is, 0.180 inches. This provides a stronger region for connecting the cross member to the side rail member. Typically, cross members are connected to the side rail members by nut and bolt fasteners which extend through aligned holes in the members. In other locations along the side rail members at which a cross member is connected, a suitable surface is provided. For example, as shown in FIG. 1, a generally rectangular region 88 is provided in the first web piece 82 for connecting the engine cross member 16. It is also noted that the rear cab mount 26 is connected to the side rail member at the location of the lap joint between web pieces 82 and 84.

In order to join the web 60 with the upper and lower plate members 32 and 34, subassemblies of the web can be made. Forming subassemblies will permit precise location of holes at lap joints for subsequent attachment of cross members. The subassemblies of the web and the upper and lower plate pieces can then be assembled in a master frame fixture and automatically spot welded. In order to join the web and the upper and lower plate members, the web is provided with welding tabs. The welding tabs, such as welding tabs 89–93 shown in FIG. 3, are formed at the base and apex of the primary web sections during the stamping operation. This forms an upper set of welding tabs for welding to the upper plate member and a lower set of welding tabs for welding to the lower plate member. The welding tabs extend perpendicularly from the primary web sections and are adapted to lie against the adjacent plate member. Automatic spot welding equipment is then employed to weld the web member to the upper and lower plate members. In order to facilitate ths operation, all of the welding tabs extend in the same direction. Therefore, the welding equipment may be located only along one side of the side rail member.

Since the web is joined to the upper and lower plate members by a welding operation, it has been found that the heat generated can cause problems particularly, warping of the plate members. In order to alleviate this problem, the upper and lower sets of welding tabs are aligned generally symmetrically about the centerline of the side rail members. This results in a more even heat distribution and dissipation and, therefore, reduces the likelihood of warpage.

It is also noted that in the formation of the welding tabs by the stamping operation, darts 94 are formed which facilitate material deformation. Additional darts 96 are formed along the intersections between the intermediate web sections and the primary web sections for the same purpose. These darts 96 also increase the strength of the web member.

A vehicle frame having the configuration described above offers a number of advantages over current vehicle frames. At the design stage the vehicle frame can be tailored in view of the loading which occurs at specific locations along the length of the frame. In other words, at high load regions, such as where cross members are connected, the frame can be strengthened by varying the dimensions described above. This avoids overdesigning which normally results in excess weight. The vehicle frame also offers advantages in economy of manufacture. The individual pieces may be fabricated using conventional stamping equipment. Current one-piece side rails require large forging processes. The individual pieces are thereafter assembled in a master fixture and welded together.

In summary, the vehicle frame assembly described above affords significant advantages over conventional vehicle frames due to its unique design. Specifically, weight savings can be achieved due to the increased strength produced by the configuration of the web member. The vehicle frame assembly can be tailored in view of the nonuniform loading conditions over the length of the vehicle frame so that the vehicle frame can be incorporated into the suspension system of the vehicle. Finally the design of the side rail members permits fabrication by means of stamping and welding rather than forging.

The invention has been described in an illustrative manner, and it is to be understood that the terminology which has been used is intended to be in the nature of words of description rather than of limitation.

Obviously, many modifications and variations of the present invention are possible in light of the above teachings. It is therefore, to be understood that the invention may be practiced otherwise than as specifically described herein and yet remain within the scope of the appended claims.

The embodiments of the invention in which an exclusive property or privilege is claimed are defined as follows:

1. A vehicle frame assembly comprising: two generally parallel, elongated side rail members and a plurality of cross members connecting said side rail members; each of said side rail members including an upper plate member, a lower plate member and a web member between said upper and lower plate members, said web member including a plurality of primary web sections having a truncated-triangular shape located along the length of said side rail member, adjacent primary web sections being inverted and spaced laterally with respect to one another and intermediate web sections connecting adjacent primary web sections.

2. An assembly as set forth in claim 1 wherein said primary web sections include upper and lower welding tabs extending perpendicularly therefrom and lying against said plate members, all of said welding tabs extending in the same direction.

3. An assembly as set forth in claim 2 wherein said upper and lower welding tabs are located generally symmetrically about the centerline of said side rail member.

4. An assembly as set forth in claim 3 wherein said web member includes multiple pieces, adjacent pieces being joined by overlapping the ends of said pieces to form a lap joint, the location of at least some of said lap joints corresponding to the location of said cross members.

5. An assembly as set forth in claim 4 wherein said upper and lower plate members include multiple pieces, adjacent pieces being joined by overlapping the ends of said pieces to form a lap joint.

6. An assembly as set forth in claim 5 wherein said lap joints between said web member pieces and said lap joints between said upper and lower plate member pieces are misaligned.

7. An assembly as set forth in claim 1 wherein said web member includes multiple pieces, adjacent pieces being joined by overlapping the ends of said pieces to form a lap joint, the location of at least some of said lap joints corresponding to the location of said cross members.

8. An assembly as set forth in claim 7 wherein said upper and lower web members include multiple pieces, adjacent pieces being joined by overlapping the ends of said pieces to form a lap joint.

9. An assembly as set forth in claim 8 wherein said lap joints between said web member pieces and said lap joints between said upper and lower plate member pieces are misaligned.

10. An assembly as set forth in claim 1 wherein said welding tabs are located generally symmetrically about the centerline of said rail member.

11. A vehicle frame assembly comprising: two generally parallel side rail members and a plurality of cross members connecting said side rail members; each of said side rail members including an upper plate member, a lower plate member and a web member between said upper and lower plate members; said web member including primary web sections which are generally parallel to the longitudinal centerline of said rail member and spaced longitudinally and laterally one from the other in alternating fashions and intermediate web sections connecting adjacent primary web sections, said intermediate web sections meeting said upper and lower plate members at an intercept angle, the majority of said intermediate web sections being non-perpendicular with respect to said upper and lower plate members thereby forming truncated-triangular shaped primary web sections.

12. An assembly as set forth in claim 11 wherein said intercept angle between said intermediate web section and said upper and lower plate members is varied at predetermined locations along said side rail members to vary the strength of said side rail members.

13. An assembly as set forth in claim 12 wherein said primary web sections include upper and lower welding tabs extending perpendicularly therefrom and lying against said upper and lower plate members, substantially all of said welding tabs extending in the same direction.

* * * * *